July 27, 1954

M. P. WINTHER 2,685,055

INDUCTION-MOTOR SPEED CONTROL

Filed Sept. 24, 1949

3 Sheets-Sheet 2

Martin P. Winther
Inventor.
Haynes and Koenig
Attorneys

July 27, 1954   M. P. WINTHER   2,685,055
INDUCTION-MOTOR SPEED CONTROL
Filed Sept. 24, 1949   3 Sheets-Sheet 3

Patented July 27, 1954

2,685,055

UNITED STATES PATENT OFFICE 2,685,055

INDUCTION-MOTOR SPEED CONTROL

Martin P. Winther, Gates Mills, Ohio, assignor, by mesne assignments, to Eaton Manufacturing Company, Cleveland, Ohio, a corporation of Ohio Application September 24, 1949, Serial No. 117,525

11 Claims. (Cl. 318—231)

1

This invention relates to A. C. motor speed controls, and more particularly to adjustable speed controls of this class wherein induction motors are supplied with variable-frequency currents by means of induction frequency converters which are mechanically loaded through eddy-current slip couplings.

The conventional squirrel-cage induction motor normally operates at one speed which is dependent upon the number of its poles and the frequency supplied. For example, a four pole induction motor supplied with 60-cycle current operates at substantially 1800 R. P. M. While there is a deviation from this speed, the deviation is only a few per cent and is dependent upon the load on the motor shaft. It is a purpose of this invention conveniently to vary the frequency and thus vary the speed of a conventional squirrel-cage induction motor when loaded.

Briefly the invention comprises an induction-motor type of frequency converter which feeds variable frequency current from its secondary to a squirrel-cage motor. The converter is mechanically loaded by an eddy-current slip coupling having a field coil. The speed of the converter, and thereby the frequency of its rotor current, is controlled by adjusting the mechanical load on the converter by varying the excitation of the loading slip coupling. As the speed of the converter is reduced below synchronization, the frequency of the current supplied to the motor is increased, thereby increasing the motor speed. Speed regulation is obtained by means of a governor which may be in the form of a speed-responsive voltage device controlling the excitation of the field coil for the eddy-current slip coupling. Other features will be in part apparent and in part pointed out hereinafter.

The invention accordingly comprises the elements and combinations of elements, features of construction, and arrangements of parts which will be exemplified in the structures hereinafter described, and the scope of application of which will be indicated in the following claims.

Figure 1:
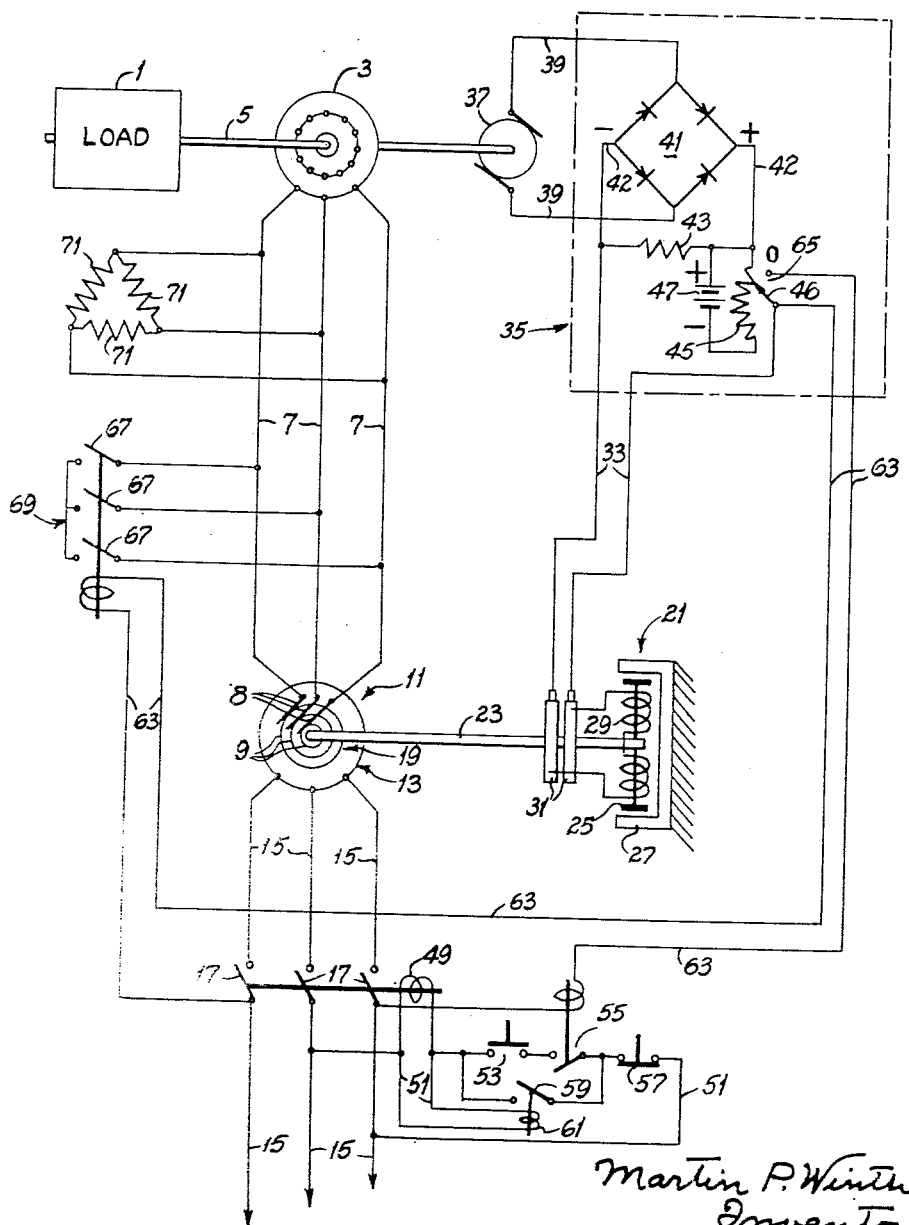
Figure 2:
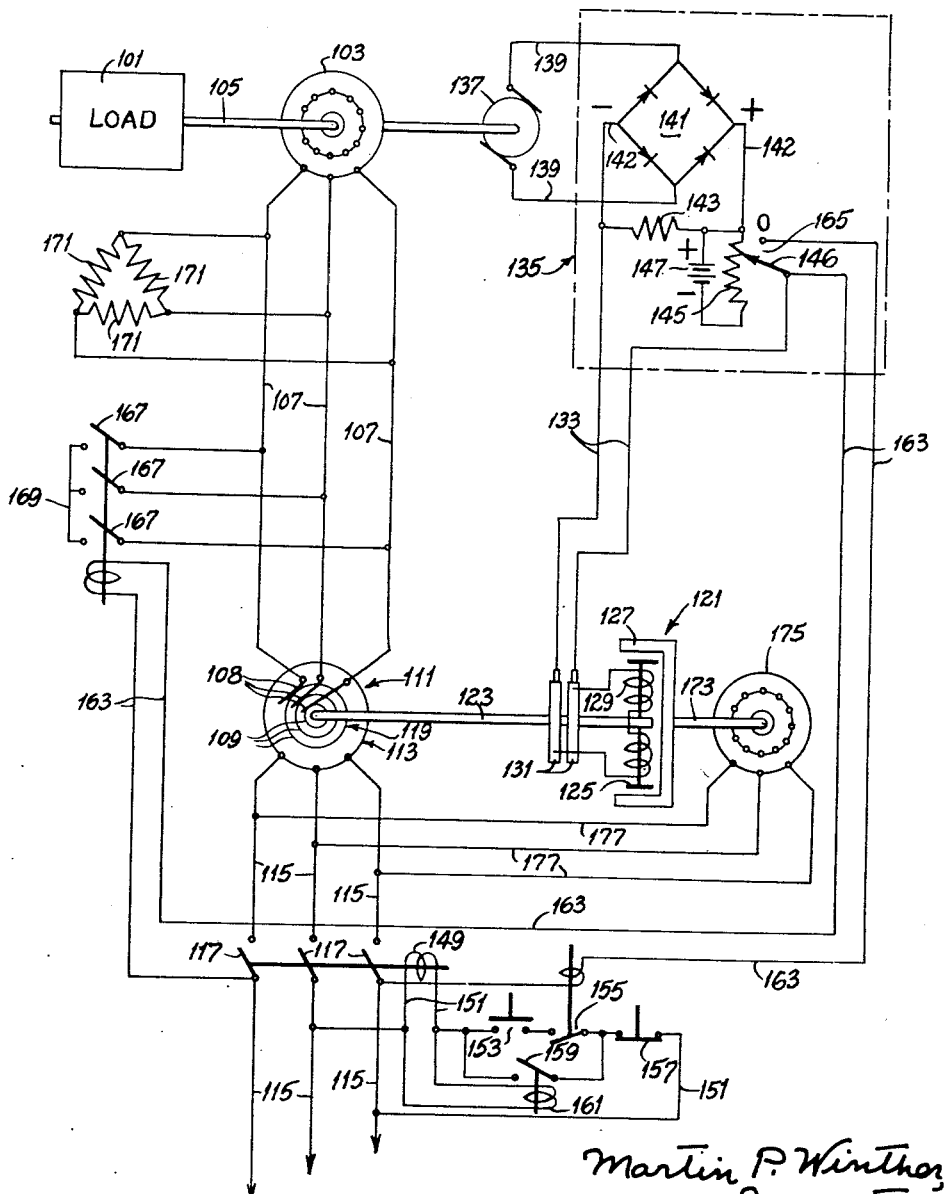
Figure 3:
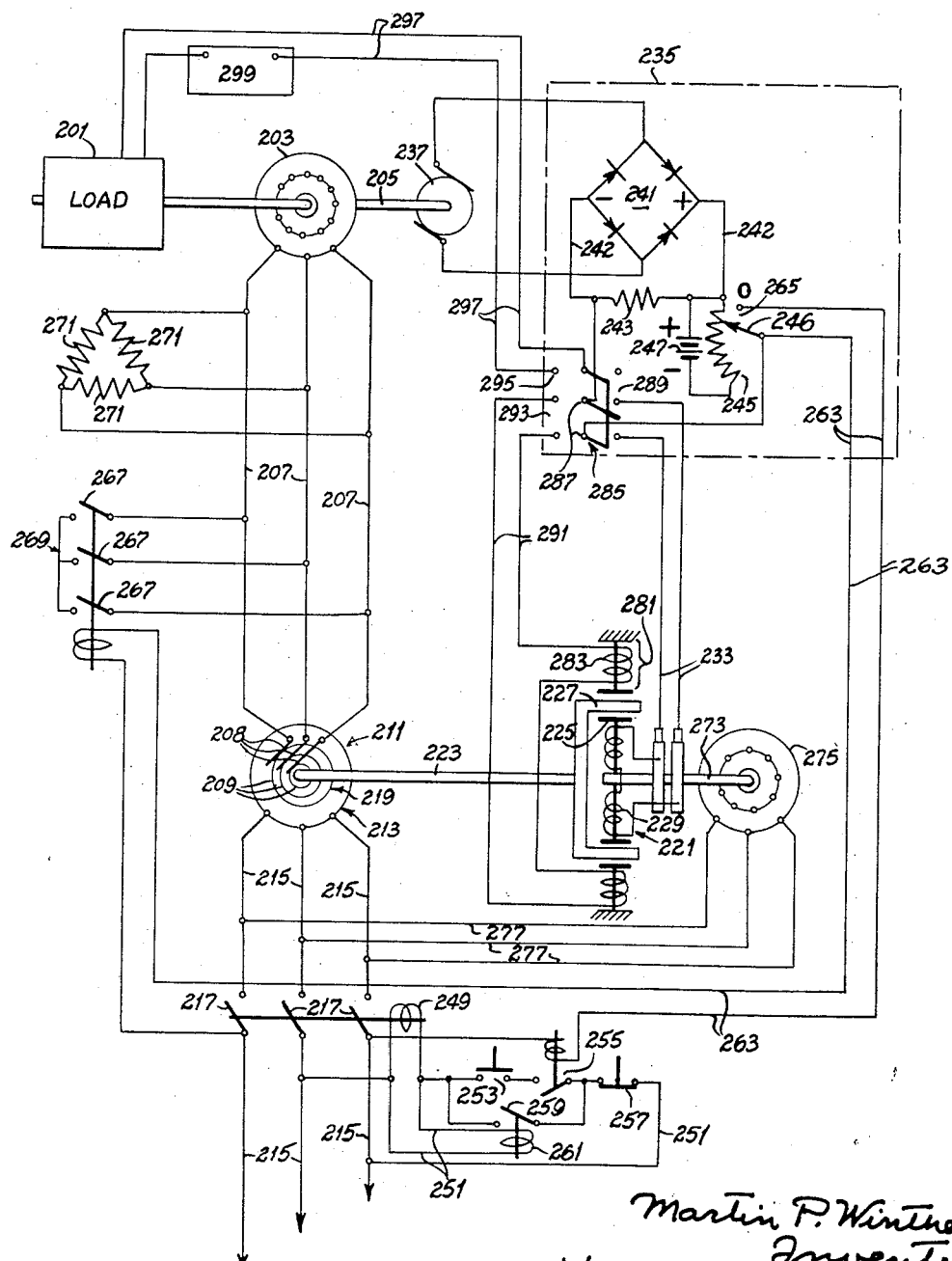

In the accompanying drawings, in which several of various possible embodiments of the invention are illustrated, Fig. 1 is a diagram illustrating the circuit and elements of one embodiment of the invention;

Fig. 2 is a diagram of a second embodiment particularly adapted for high-speed operation; and, Fig. 3 is a diagram of a third embodiment particularly adapted for quick changes in supplying and absorbing regulated power.

2

Similar reference characters indicate corresponding parts throughout the several views of the drawings.

Referring to Fig. 1 of the drawings, there is indicated a load 1 which is to be driven at regulated but variable speeds. A conventional three-phase, squirrel-cage induction motor 3 is coupled to the load by motor-load shaft 5. The field of the squirrel-cage motor is energized through lines 7 which are in turn connected through brushes 8 and slip-rings 9 to the wound-rotor secondary 19 of an induction-motor type of frequency converter 11, herein referred to as an induction frequency converter. The field 13 of converter 11 is supplied with current by three-phase, 60-cycle lines 15 connected through main switches 17.

It will be understood that the frequency of the converter output from secondary 19 is a function of the rotational speed of the converter. When the converter is running near synchronous speed, its output frequency is substantially zero inasmuch as its secondary rotates at substantially the same speed as the field. The frequency increases as the speed is reduced until when the rotor 19 is stationary, the converter operates as a transformer supplying 60-cycle current through lines 7.

The rotational speed of the converter is controlled by means of an eddy-current slip coupling 21 mounted on converter shaft 23. The slip coupling is operated as a brake to apply an adjustable mechanical load to the converter. It has a relatively rotary field member 25 mounted on converter shaft 23, a relatively fixed inductor member 27, and a field coil 29. A detailed description of an exemplary eddy-current slip coupling is given in the following United States patents: Re. 20,225; 2,106,542 and 2,470,596. The coupling or braking effect is increased by increasing the excitation of the field. Slip-rings 31 and leads 33 form a connection from field coil 29 to a suitable controller 35 schematically indicated within the dash lines.

The controller 35 is adapted to feed an adjustable direct current to the slip coupling field coil thereby to control its excitation and the load on the converter. A governor is incorporated in the controller for speed regulation purposes. It should be understood that the simplified schematic governor circuit shown within the dash lines is illustrative and that other appropriate circuits may be used. For example, electronic control circuits such as shown in United States Patent Nos. 2,286,778, 2,353,107 and 2,411,122 may be adapted for controlling the slip coupling of this invention. However, the schematic circuit shown in 35 facilitates understanding of the invention.

Leads 39 connect a permanent magnet A. C. generator 37 to the input terminals of a bridge rectifier 41. The output terminals 42 of the rectifier are connected across a resistor 43. Resistor 43 in turn is connected in series with a voltage divider 45. Members 43 and 45 are connected in series with leads 33 through an adjustable arm 46. Leads 33 feed the field coil 29. A battery 47 is connected across the voltage divider so as to apply an adjustable D. C. voltage across the field coil. The polarity of the rectifier 41 is such as to oppose flow of current from the battery to the field coil. Thus, as generator 37 speeds up, the excitation of field coil 29 is reduced with the result that any braking action of the inductor 27 of coupling 21 is reduced and thus the rotor of converter 11 is permitted to accelerate.

It is preferable to bring the converter 11 up to full speed prior to starting the motor 3. This is accomplished by a switching circuit described below. Main switches 17 are under the control of a relay coil 49 connected in a lead 51. Lead 51 is connected across a pair of the power lines 15 and is broken by a pushbutton starter switch 53, a relay operated switch 55, and a push-button stop switch 57. A holding switch 59 operated by relay coil 61 in line 51 is connected around switches 53 and 55.

Switch 55 is under the control of a relay circuit including leads 63. Leads 63 are connected across a pair of the power lines. Their circuit is broken by a switch 65 at the voltage divider 45. When the voltage divider is in the zero position for an unexcited brake coil, the switch 65 is closed. Closure of switch 65 in turn causes relay switches 55 and 67 to close. The latter control a shorting circuit 69 for the secondary 19 of the converter.

It will be noted that resistors 71 are connected across the lines 7. When the motor 3 is run at a low speed and the converter 11 at a high speed to provide the necessary low frequency, the losses in the converter and brake tend to hinder speed regulation. The load supplied by resistors 71, about 10% of the total load of motor 3, permits the motor to be run at low speeds fully under the control of controller 35. That is, if motor 3 is run at a very low speed and is lightly loaded, the current drawn by the motor may not be sufficient to maintain the converter near synchronous speed where it can produce the low frequency required. Bearing and windage losses tend to reduce the speed, hence the resistors provide the minimum secondary current and secondary field strength required to overcome these losses.

Operation is as follows:

Voltage divider 45 is set in the zero position so that the eddy-current brake exerts a minimum braking effect on the converter. Switch 65 is closed thereby closing switches 55 and 67. The latter operate the shorting circuit 69 to short-circuit the converter secondary 19. Starting switch 53 is then actuated to close main switches 17 and holding switch 59 by means of coils 49 and 61, respectively. The converter 11 operates as a relatively lightly loaded, conventional induction motor and quickly seeks synchronous speed. Hence the motor 3 is not energized and does not rotate.

After the converter has reached full speed, the voltage divider 45 is adjusted away from the zero position. Such adjustment opens switch 65 and thereby opens switches 67 of the shorting circuit 69. Holding switch 59 prevents the main switches 17 from opening upon opening of switch 55. When shorting circuit 69 is opened, resistors 71 and motor 3 are, in effect, inserted into the secondary circuit of the converter. Also, as voltage divider 45 is adjusted away from the zero position, the field coil 29 of the eddy-current brake is excited by current from the battery 47. An increasing load is thus applied to the converter which reduces its speed. The frequency of the converter output then increases as the converter slows down and motor 3 is gradually brought up to speed. Voltage divider 45 is adjusted until the desired motor speed is obtained.

The desired motor speed is maintained by operation of the governor. For example, if motor 3 should transiently slow down as a result of an increase in load 1, the output of generator 37 would decrease. Since the generator voltage output is bucking the voltage of battery 47, as indicated by the signs the net effect is an increase in the field excitation of brake 21. Increased braking and reduced slip is had and converter 11 reduces speed. As the speed of the converter is reduced, the frequency of its output is increased thereby tending to increase the speed of motor 3 and counteract the transient decrease of motor speed.

By way of example, assume converter 11 is braked to run below synchronous speed and supply 30-cycle current to a four-pole induction motor 3, which in turn is running on a light load at 890 R. P. M. If the motor load were to increase to full load without a change in line frequency (lines 7), the speed of motor 3 might drop to 865 R. P. M. However, the governing action herein increases the line frequency to 30⅔ cycles, resulting in a motor speed of 885 R. P. M., or a drop of only 5 R. P. M. for about a 90% change in load. The above values should be taken as illustrative of the operation and not as limiting. Speed regulation may be had by mounting generator 37 on the converter shaft 23. In such instance, a change in the motor load would effect the speed of operation of the converter thus giving the desired speed regulation. However, a more sensitive control is obtained by mounting the generator on the motor-load shaft 5, as shown, where it can react immediately to speed variations.

An alternative embodiment of the invention is illustrated in Fig. 2. The construction is similar to that of Fig. 1, hence like parts are indicated by numbers which are one-hundred higher. The essential difference in this embodiment resides in the eddy-current slip coupling 121. As before, one member 125 of the coupling is mounted on the converter shaft 123. The other coupling member 127 is mounted upon a shaft 173 of a second independent induction motor 175. Motor 175 is energized from power lines 115 by lines 177. It drives the coupling member 127 at a substantially constant speed in a direction opposite from that of the converter 111.

Operation of the device is the same as previously described with certain exceptions noted below. When the field of slip coupling 121 is not excited, converter 111 and motor 175 run independently of one another and converter 111 assumes its full speed. As the slip coupling is excited, braking effect results which causes the converter to slow down and increase the frequency of its output through lines 107. The braking effect is had by the coupling action between the oppositely running rotating elements 125 and 127. The speed of motor 175 is not appreciably effected by the converter 111, hence for a certain degree of coupling, the converter may be brought to a standstill. Motor 175 continues to rotate at substantially synchronous speed. If the slip coupling is further excited, the converter will be rotated in a direction opposite to its normal direction of rotation and opposite to the rotation of the field induced in its field member 113. Such rotation results in an output frequency greater than the frequency in line 115 or greater than 60 cycles.

Thus, motor 103 may be brought up to near its normal 60-cycle synchronous speed by reducing the speed of the converter towards zero. As the converter 111 is reversed, the speed of motor 103 is increased beyond its normal synchronous speed for a frequency of 60 cycles, thereby permitting motor 103 to be driven at a speed in excess of that obtainable from conventional 60-cycle power lines. For example, if motor 103 is a two-pole induction motor adapted to be driven normally by 60-cycle current, its synchronous speed would be 3600 R. P. M. When motor 175 drives the converter in a direction opposite to the field rotation, motor 103 in turn is driven at a speed greater than 3600 R. P. M. Thus, the embodiment of Fig. 2 is particularly adapted for high speed drives, the slip coupling operating alternatively as both a brake and a reverse-acting clutch. Governing action is the same as before.

Fig. 3 illustrates another embodiment of the invention wherein the drive is selectively operable as a motor or as a dynamometer, that is, both supplies and absorbs power relative to the load 201. For example, load 201 may be an automotive engine which is to be tested by being driven at a predetermined speed and by being loaded when running at or near the same speed. The drive is similar to that of Fig. 2 with certain exceptions hereinafter noted, hence like parts are indicated by numbers which are two-hundred higher than in Fig. 1 and one-hundred higher than in Fig. 2.

A conventional induction motor operates as a generator when driven above its synchronous speed, and tends to assume the line frequency, delivering energy back into the supply line. The speed regulation when operating as a generator is substantially the same as when operating as a motor. For example, if it has a 50 R. P. M. speed regulation as a motor, it will likewise have a 50 R. P. M. speed regulation as a generator.

When the rotary induction machine 203 is motoring, its actual speed is equal to the synchronous speed less the slip, the former being dependent upon line frequency and the latter being dependent upon torque. When the machine 203 is braking the load 201 or generating, its actual speed is equal to the synchronous speed plus slip. Thus, switching from one condition to the other will result in a speed variation of twice the slip for a given load if the line frequency is unchanged. For example, where the synchronous speed is 1000 R. P. M., the variation may be from 950 as a motor to 1050 as a generator for full load, or a change of 100 R. P. M. This embodiment of the drive is adapted to reduce the speed variation below such figures by also changing the synchronous speed of machine 203 when switching from one condition to the other. The synchronous speed of machine 203 is changed by braking the converter 211 so as to alter the line frequency for machine 203. As was previously noted, the synchronous speed is proportional to the line frequency.

Referring to Fig. 3, the above-stated action is accomplished by the provision in the eddy-current slip coupling 221 of a second stationary braking field member 281 and an associated field coil 283. Field member 281 is fixed to exert a braking effect upon the member 225 which is mounted on the converter shaft 223. The braking member 281 is operative on the inductor 227 when the machine 203 is driven as a power-absorbing generator. The other field member 225 mounted on motor shaft 273 of motor 275 is operative on the inductor 227 when the machine 203 drives the load 201.

Controller 225 is adapted to provide the desired operation. A double-throw triple-pole switch 285 selectively connects and disconnects the two field coils 229 and 283 to the control circuit including voltage divider 245 and resistor 243. Leads 233 from field coil 229 are connected by two poles 287 at one side 289 of the double-throw switch 285. Leads 291 from field coil 283 are connected at the other side 293 of poles 287. A third pole 295 controls the engine 201; for example, it may be ignition switch of an internal combustion engine. Leads 297, forming part of an ignition circuit, communicate from pole 295 to the engine. The usual auxiliaries for such a circuit are illustrated diagrammatically at 299. Thus, when switch 285 is thrown to close the ignition circuit of engine 201, which drives motor 203 as a generator, switch 285 also deenergizes field coil 229 and energizes field coil 283.

The operation of the drive as a motoring drive is the same as that described for the Fig. 2 embodiment, switch 285 being thrown to excite the field coil 229. If the motor-load shaft 205 should increase speed, the governor reduces the excitation of the field coil thereby permitting converter 211 to accelerate. The line frequency in lines 207 is reduced and the motor 203 slows down to counteract the initial speed increase.

If it is then desired to have the engine run under its own power, ignition switch 295 is closed and at approximately the same time switch 285 opens the circuit for field coil 229 and closes the circuit for field coil 283. As the load is removed from motor 203, it tends to assume its synchronous speed for the frequency being supplied by the converter 211. As motor 203 is driven beyond its synchronous speed by the engine, it begins to operate as an induction generator and feed current through lines 207 to the converter 211. Also, when operating as an induction generator, machine 203 loads the engine 201 an amount determined by the deviation from the aforementioned synchronous speed.

Speed regulation during operation as a generator is provided as before. If the speed of shaft 205 increases, the excitation of braking coil 283 is reduced. Converter 211, being released, tends to speed up and the line frequency (lines 207) decreases. The synchronous speed of machine 203 is reduced, and accordingly, the slip speed is temporarily increased causing a greater torque to be exerted by the machine 203. The increased torque causes shaft 205 to slow down, thereby counteracting the initial speed increase. As machine 203 slows down, the slip and torque are reduced to the normal desired values.

As was previously noted, in switching from motoring to generating, the speed of machine 203 increases from a value below synchronization to a value above synchronization. The two field coils are adapted to counteract this speed variation. This is accomplished by dropping the synchronous speed when going from motoring to generating. Field coil 283 exerts a lesser braking effect than field coil 229. Thus, when field coil 283 is energized, the converter 211 increases speed, thereby reducing the frequency in lines 207. Reduction of line frequency effects the desired reduction of synchronous speed. In going from generating to motoring, the synchronous speed of machine 203 is increased in a like manner. Thus, it is possible to reduce the net variation considerably.

The speed for motoring or generating is set by voltage divider 245 without the necessity of readjustment when switching from one condition of operation to the other.

From the above, it will be seen that there is provided an induction-motor speed control operable at variable speeds from conventional 60-cycle lines. The drive is adjustable substantially above or below the normal synchronous speed rating of the motor at 60 cycles. Furthermore, the drive may be employed as a motor-dynamometer for supplying and absorbing power, being readily converted from one condition to the other with minimum speed variation. The governor incorporated in the drive maintains the desired speed regardless of wide load variations. Other features include the provision of the starting circuit and the provision of means for operating the motor at low speeds without loss of governor sensitivity.

It will be understood that, while an eddy-current type of magnetic slip coupling for the elements 21, 121 and 221 is preferable, other magnetic slip couplings may be employed. The advantage of this magnetic class of coupling is that its speed is conveniently regulated throughout wide changes of speed, through regulation of its field, without supplying energy thereto through any additional complicated circuits such as would be needed if other controls such as motors or the like were used in connection with the shafts 23, 123 or 223. Moreover, such motors or the like would need to be of the variable-speed type and therefore bulky.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A motor speed control comprising an induction motor adapted for coupling to a load, an induction frequency converter having its secondary electrically connected to said motor, an eddy-current slip coupling having slip members both of which are rotary and one of which is connected for mechanically loading said converter, its other member being driven, and a motor adapted to drive said other member at speeds underrunning and overrunning the connected slip member.

2. A motor speed control comprising an induction motor adapted for coupling to a load, an induction frequency converter having its secondary electrically connected to said motor, an eddy-current slip coupling having one of its slip members connected for mechanically loading said converter, its other member being driven, and an induction motor for driving said other member at speeds underrunning and overrunning the connected member.

3. A motor speed control comprising an induction motor adapted for coupling to a load, an induction frequency converter having its secondary connected to the field of said induction motor and to a resistance which is parallel-connected with the motor, an eddy-current slip coupling mounted on the shaft of said converter, said slip coupling having a field coil, a controller for adjustably exciting said field coil, and a shorting circuit connected with said resistance and motor in the converter secondary adapted to be closed and short out said resistance and motor during starting and adapted to be opened to excite said resistance and motor after the converter has reached synchronous speed, said shorting circuit being adapted to open when the field coil of the eddy-current slip coupling is excited.

4. A motor speed control comprising an induction motor adapted for coupling to a load, an induction frequency converter having its secondary connected to the field of said first induction motor, an eddy-current slip coupling clutch having one clutch member coupled to the converter shaft, a second motor coupled to the other clutch member of said eddy-current slip coupling, said slip coupling having a field coil, and a controller for adjustably exciting said field coil.

5. An adjustable-speed induction-motor drive comprising an induction motor adapted for coupling to a load, an induction frequency converter having its secondary connected to the field of said first induction motor, an eddy-current slip-coupling clutch having one clutch member coupled to the converter shaft, a second motor coupled to the other clutch member of said eddy-current slip coupling, said slip coupling having a field coil, and a control for adjustably exciting said field coil, said second motor and said converter normally rotating in opposite directions.

6. An adjustable-speed induction-motor drive comprising an induction motor adapted for coupling to a load, an induction frequency converter having its secondary connected to the field of said first induction motor, an eddy-current slip-coupling clutch having one clutch member coupled to the converter shaft, a second motor coupled to the other clutch member of said eddy-current slip coupling, said slip coupling having a field coil, and a controller for adjustably exciting said field coil, said controller including a governer responsive to the speed of said first induction motor for varying the excitation of said clutch field coil inversely with the speed of said first induction motor.

7. A variable-speed induction-motor drive comprising an induction machine adapted for motoring and generating, an induction frequency converter having its secondary connected to the field of said induction machine, an eddy-current slip coupling for mechanically loading said converter, said slip coupling having two controlling field coils, a controller for adjustably exciting said field coils, thereby controlling the load on the converter, and a switch for selectively exciting one of said field coils when the induction machine is motoring and exciting the other of said field coils when the induction machine is generating.

8. An adjustable-speed, induction-machine drive comprising an induction machine adapted for motoring and generating, an induction frequency converter having its secondary connected to the field of said induction machine, an eddy-current clip coupling mounted on the shaft of said induction frequency converter, said slip coupling having a field coil and a control circuit for adjustably exciting said field coil, said control circuit including a governor for varying the excitation of said field coil inversely to the speed of the induction machine, and switching means for reducing the mechanical load on said converter when changing the operation of said induction machine from motoring to generating, thereby reducing the synchronous speed of said induction machine.

9. A variable-speed drive comprising a convertible induction motor-generator for motoring and generating, an induction frequency converter having its secondary connected to the field of said motor-generator, an eddy-current slip coupling having a rotary inductor connected to the converter for mechanically loading it, said slip coupling having a rotary field member and a stationary field member, an induction motor driving said rotary field member, a generator driven by said motor-generator, a control circuit connecting said generator and the field members of the slip coupling, and a switch in said circuit for selectively exciting the stationary field member when the motor-generator is generating and for exciting the rotary field member when the motor-generator is motoring.

10. A variable-speed drive comprising a convertible induction motor-generator for motoring and generating, an induction frequency converter having its secondary connected to the field of said motor-generator, an eddy-current slip coupling having a rotary inductor connected to the converter for mechanically loading it, said slip coupling having a rotary field member and a stationary field member, an induction motor driving said rotary field member, a generator driven by said motor-generator, a control circuit connecting said generator and the field members of the slip coupling, a switch in said circuit for selectively exciting the stationary field member when the motor-generator is generating and for exciting the rotary field member when the motor-generator is motoring, a controller in said circuit operative to control either field member when excited, a shorting circuit for the converter, and a switch in the circuit control circuit operative to close the shorting circuit during starting of the motor-generator and to open said shorting circuit thereafter.

11. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; means for controlling said brake to cause the same to regulate the speed of said frequency changer throughout a speed range including all intermediate speeds from line frequency down to zero frequency and, conducting means for transmitting said variable and controllable voltage and frequency to said machine whereby the same will be driven at a speed relative to the value of said voltage and frequency so transmitted.

References Cited in the file of this patent

UNITED STATES PATENTS

| Number | Name | Date |
| --- | --- | --- |
| 2,074,126 | Mead | Mar. 16, 1937 |
| 2,087,782 | Rossman | July 20, 1937 |
| 2,335,874 | Mayer et al. | Dec. 7, 1943 |

FOREIGN PATENTS

| Number | Country | Date |
| --- | --- | --- |
| 95,136 | Switzerland | June 16, 1922 |